Figure 4:
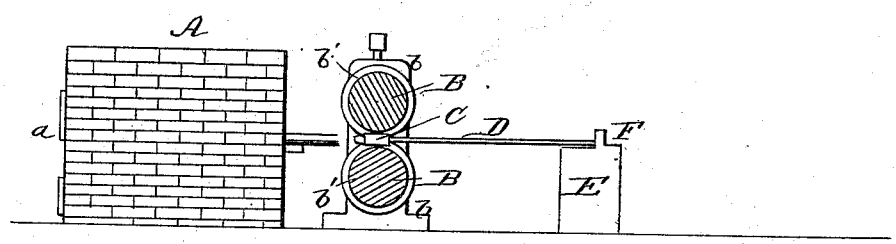

(No Model.) 2 Sheets—Sheet 1.
J. LIPPINCOTT.
MANUFACTURE OF TUBING.
No. 330,338. Patented Nov. 10, 1885.
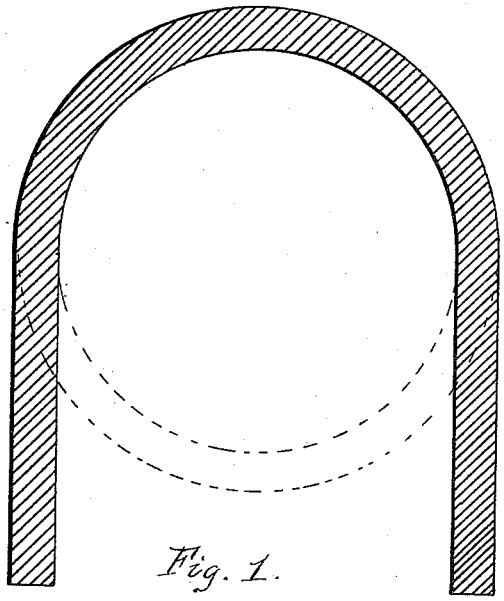
Fig. 1.
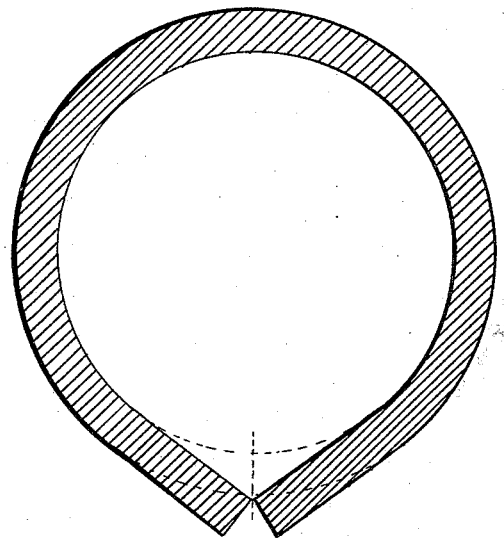 
Fig. 2. Fig. 3.
Witnesses
H. C. Huntemann
D. P. Cone
Inventor
John Lippincott
By
Connolly Bros & McIghe
Attys (No Model.)

J. LIPPINCOTT.
MANUFACTURE OF TUBING.

No. 330,338. Patented Nov. 10, 1885.

Witnesses.
A. W. Bright
G. E. Tucker

John Lippincott
Inventor.

UNITED STATES PATENT OFFICE.

JOHN LIPPINCOTT, OF BALTIMORE, MARYLAND.

MANUFACTURE OF TUBING.

SPECIFICATION forming part of Letters Patent No. 330,338, dated November 10, 1885.

Application filed June 11, 1885. Serial No. 168,341. (No model.)

*To all whom it may concern:*

Be it known that I, JOHN LIPPINCOTT, of Baltimore, in the county of Baltimore, State of Maryland, have invented certain new and useful Improvements in the Manufacture of Wrought-Iron Seamless Tubing; and I do hereby declare that the following is a full, clear, and exact description of the invention, which will enable others skilled in the art to which it appertains to make and use the same, reference being had to the accompanying drawings, which form a part of this specification.

This invention has relation to the manufacture of wrought-iron tubing, and has for its object the provision of a novel method of forming and welding the joint, which may be carried into effect without increase of cost over the present methods of welding tubing, and which shall produce a tube having greater strength, security, and finish than tubes welded by any of the methods heretofore in use.

Wrought-iron tubes, formed by bending a skelp and welding the edges together to form a close joint, are of two kinds—viz., "lap-welded" and "butt-welded." In producing a lap-weld the skelp, previous to bending, has its edges scarfed or beveled, so that when brought together to form a tube said edges shall overlap and allow of their being welded together by the use of the welding-ball and other common appliances. In forming the scarf or bevel on the edges for the purpose of lap-welding considerable labor and expense are entailed in performing the work so as to produce uniformity in the shape of the edges of the skelp, and unless the operation is performed carefully a true, even, and secure weld-joint cannot be obtained. Again, in bending the skelp so that the edges shall overlap, complex methods and machinery must be employed, and all these add to the cost of manufacture and increase the difficulty of producing a perfect tube. In butt-welding the skelp is formed with its edges perpendicular to the plane of the metal, and previous to welding is bent to a complete circle or cylindrical shape, the skelp in width being proportioned exactly to the circumference of the tube; hence when the circle is completed the edges abut at their inner angle on a line with the inner surface of the tube. Now, in welding the edges together the stock required to form a weld of the same thickness as the body of the skelp must be taken from the body of the skelp by drawing, gathering, or forcing the metal thereof toward the edges. Under these conditions an enormous strain is imposed on the devices by which the tube is held, while it is obvious that the tube is weakened more or less by diminishing the stock and by its subjection to abnormal stretching and wrenching. Unless the stock is thus forced up in closing and welding the joint a flattening or thinning will be produced at this point, and hence the tube will be greatly weakened at the welded joint and its true cylindrical shape destroyed. Moreover, there is a liability of the edges not coming together properly or fully, and as a consequence a breaking down of the stock at that point may result in the production of a very imperfect and practically useless tube.

My invention contemplates the production of a butt-welded tube wherein none of the difficulties or disadvantages of the present methods are met with. Instead of taking a skelp of a width equal to the outer circumference of the finished tube, I use a skelp of slightly greater width, and hence in bending the same previous to welding the joint I bring the edges together at their angles on a line approximating the outer circumference of the tube. Now, when the edges are heated and subjected to welding-pressure in the direction of the diameter of the tube, they come together throughout their entire area, and there being a surplus of stock, owing to the increased width of the skelp, lateral compression takes place, and the result is a stronger, more compact, and tighter weld than can be produced by any other known process. It will be seen that the welding is downward, and resultantly in a lateral direction, or toward the body of the stock, and hence may be performed under the same conditions as in the case of lap-welding, by the use of the welding ball and rolls.

In the accompanying drawings I have illustrated by diagrams the steps or successive periods in the process of butt-welding according to my invention, Figure 1 representing the skelp bent to an approximate circle, with the inner angles of the edges abutting on a line with or approximating the outer circumference of the tube, while Fig. 2 represents the skelp bent to a half-circle, and Fig. 3 a perspective view of the skelp, the dotted lines on which indicate the difference between the width of the skelp and the circumference of the finished tube; Fig. 4, a side elevation of the furnace, the rolls and the welding-ball ordinarily employed in making tubing by the process of rolling; and Fig. 5 an elevation of a pair of rolls with the welding-ball in position between them and the skelp in the act of passing through the rolls, the latter being cut off just in front of the rolls to show the manner in which its edges meet before passing into the rolls.

As my invention consists, essentially, in the manufacture of a butt-welded tube from a skelp of a width somewhat greater than the circumference of the finished tube, I do not limit myself to any specific process of reducing such skelp to the tubular welded form, as the process can be carried into effect by many varied operations well known to the art of tube-making. Any process or series of steps conducive to the main result may be employed. I prefer, however, to adopt the simplest mechanical expedients in order that the tube may be not only perfect in its structure, but less expensive to manufacture than the lap or butt welded tubes in common use.

In the drawings, Fig. 4, I have shown the apparatus usually employed in forming tubing by the rolling process. As my invention may be fully carried out by such process, I will now proceed to describe the steps of the same.

In the said figure of the drawings, A designates a furnace into which the skelp is introduced through a door, a, having first, however, been bent into a semicircular form in the usual manner. Behind the furnace A is arranged a pair of welding-rolls, B B, mounted in suitable housings, b b. These rolls B B are formed with semicircular grooves b' b', and within the circular space formed by the junction of these semicircular grooves is arranged a welding-ball, C, which is fixed on the end of a mandrel, D, which in turn is supported on a table, E, and braced against a post, F, thereon. The furnace A is provided with an opening, a', at its rear, through which the skelp is pushed by an operative at the front of the furnace. The skelp being heated to a proper degree in the furnace A, is pushed forward into the rolls B B, and the latter bend the skelp around the welding-ball C and, in conjunction with the latter, weld the two edges of the skelp together and form the completed pipe.

In carrying my invention into effect I employ precisely the same instrumentalities which are now in common use for manufacturing tubing, and which have just been briefly described; and hence I make no claim to the apparatus which I employ, and will remark that my invention could as easily be carried into effect by means of other apparatus. I therefore wish it to be understood that the novelty of my invention does not lie in the apparatus, but in the employment of a skelp of a width greater than the circumference of the finished tube.

Figure 5:
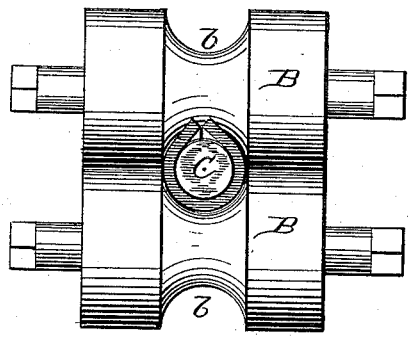

In Fig. 5 of the drawings I have shown a skelp of a width greater than the circumference of the tube which it is to form in the act of passing through the rolls. From an inspection of this figure it will be observed that the edges of the skelp meet just previously to reaching the rolls, and that in order to pass through the latter it is necessary that the edges of the skelp be upset and compressed into one another in order to allow it to pass through the orifice formed by the grooves of the rolls. This orifice is of course of the exact diameter of the tube which is to be produced, and hence it follows that if a skelp which when bent around into tubular form is of a greater circumference than the orifice, and be forced through the same, the material of which the skelp is formed must necessarily be upset or compressed in order to allow it to pass through.

What I claim as my invention, and desire to secure by Letters Patent, is—

In the manufacture of butt-welded wrought-iron tubing, the method of forming a butt-weld, which consists in first bringing the edges together at their inner angles on a line corresponding with or approximating the outer circumference of the tube and then welding by radial pressure, substantially as described.

In testimony that I claim the foregoing as my own I have hereto affixed my signature in presence of two witnesses.

JOHN LIPPINCOTT.

Witnesses:
J. G. BACKOFEN,
ALVA A. MOORE.